United States Patent [19]

Nishida et al.

[11] Patent Number: 5,348,461

[45] Date of Patent: Sep. 20, 1994

[54] APPARATUS FOR ASSEMBLING MOLDED PRODUCTS

[75] Inventors: Shoso Nishida, Hiroshima; Yusuke Shiotani, Aichi, both of Japan

[73] Assignee: The Japan Steel Works, Ltd., Tokyo, Japan

[21] Appl. No.: 14,134

[22] Filed: Feb. 5, 1993

[30] Foreign Application Priority Data

Feb. 5, 1992 [JP] Japan .................................. 4-054305
Feb. 5, 1992 [JP] Japan .................................. 4-054306

[51] Int. Cl.5 .............................................. B29C 45/40
[52] U.S. Cl. .................................. 425/129.1; 264/241; 264/250; 264/334; 425/556; 425/572
[58] Field of Search .................... 425/556, 129.1, 572; 264/334, 250, 239, 241

[56] References Cited

U.S. PATENT DOCUMENTS 4,900,493  2/1990  Bartels et al. ........................ 264/71

FOREIGN PATENT DOCUMENTS 3238185  12/1983  Fed. Rep. of Germany .
2301375   9/1976  France .
2251202   7/1992  United Kingdom .

OTHER PUBLICATIONS

JSW Technical Report, vol. 44, Oct. 1, 1990, "High Cycle Molding System of MFD Shell", pp. 1–4, author unknown.
Japanese version of JSW Technical Report, vol. 44, No. 10, Oct. 1, 1990, pp. 165–167.

Primary Examiner—Tim Heitbrink
Attorney, Agent, or Firm—Sughrue, Mion, Zinn, Macpeak & Seas

[57] ABSTRACT

A system for assembling molded products wherein two or more products molded by an injection machine are assembled with each other with a reduced space required for taking them out from the injection molding machine and then assembling them together while a cycle time for each injection molding operation is shortened. After completion of the upper and lower shell halves, the shell halves molded in the die are dropped and assembled along two or more grooves by an ejection operation of molding machine. After that, the assembled products are conveyed to the outside by driving a conveying unit arranged in a bed.

4 Claims, 6 Drawing Sheets

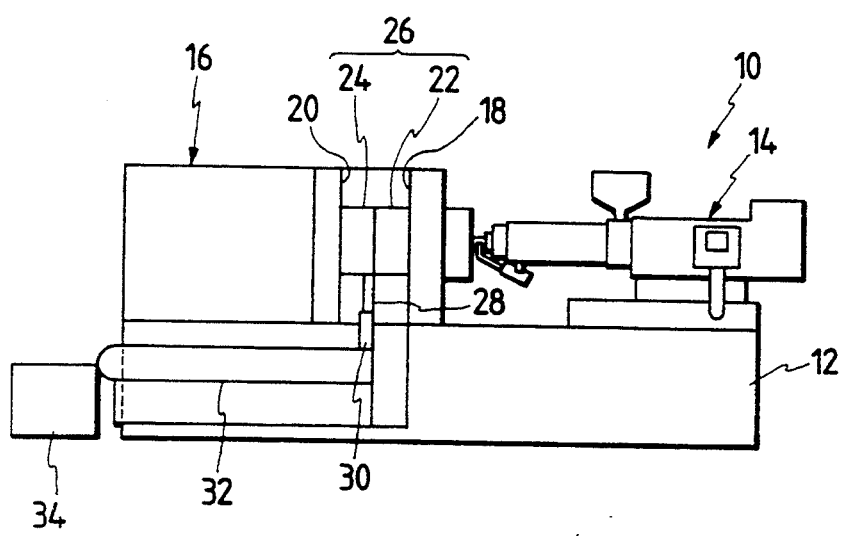
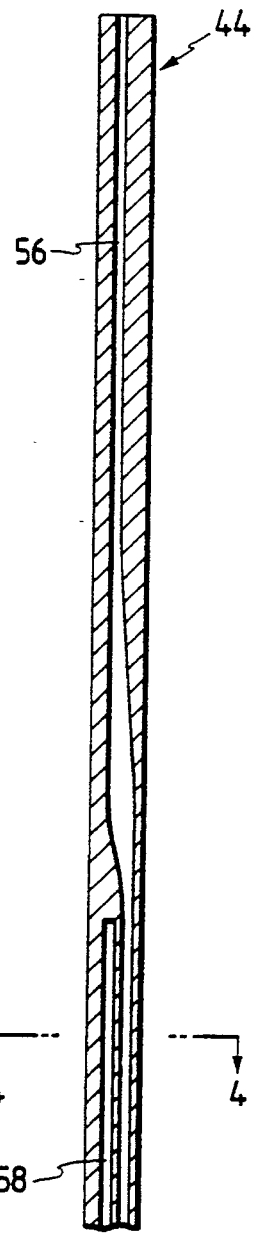
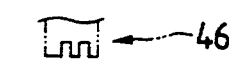
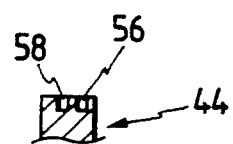

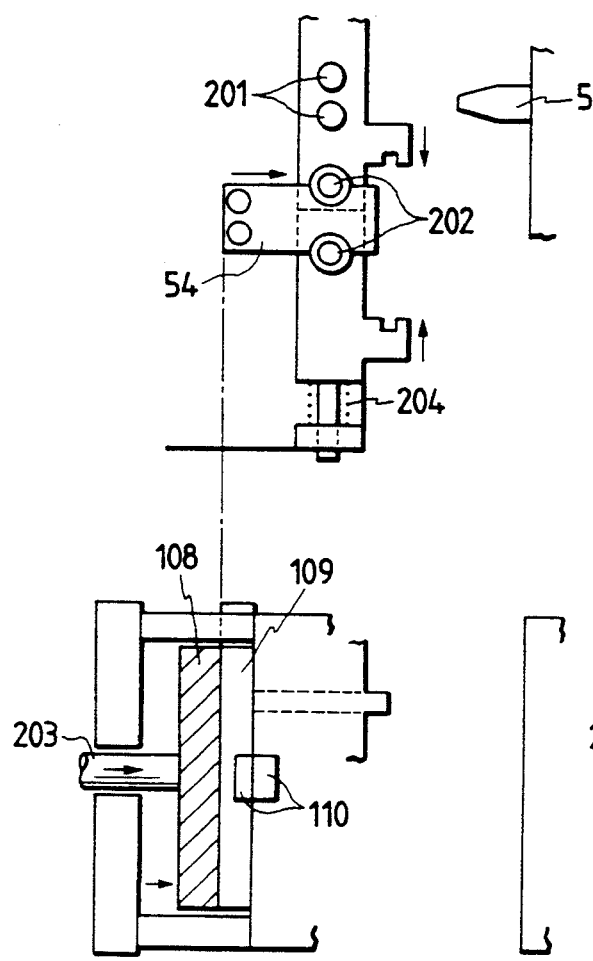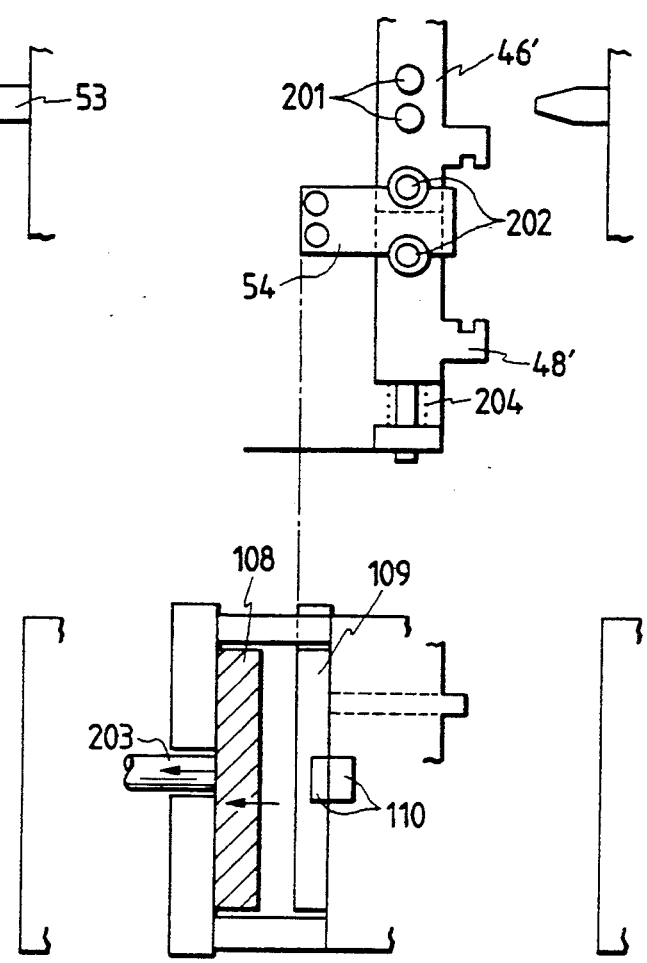

APPARATUS FOR ASSEMBLING MOLDED PRODUCTS

BACKGROUND OF THE INVENTION

The present invention relates to molding/assembling method and apparatus for molding and assembling molded products, e.g., shell halves constituting a casing for a microfloppy disc (hereinafter referred to simply as an MFD). Moreover, the present invention further relates to an aligning/dropping mechanism for allowing molded products, e.g., shell halves constituting a casing for the MFD to drop by their own tare while they are aligned with each other in order to take out the molded products to the outside from an injection molding system.

Shell halves constituting a casing for an MFD have been hitherto molded and assembled together in the following manner. Specifically, an upper shell half and a lower shell half for the MFD are simultaneously molded in an injection molding machine and the molded shell halves are then taken out from the injection molding machine by actuating robot hands. Subsequently, the upper shell half and the lower shell half are assembled with each other in an assembling unit installed adjacent to the injection molding machine to produce a casing for an MFD. After completion of the assembling operation, the casing is conveyed from the assembling unit to a stocker or the like.

However, with the conventional molding/assembling method and apparatus constructed in the above-described manner, it is necessary to additionally arrange a robot unit for dislocating a molded product of shell half, an assembling unit for assembling shell halves together and a conveyor for conveying an assembled product of the casing to the outside wherein each of the foregoing units is arranged or installed adjacent to or in the vicinity of the injection molding machine. Consequently, there arises a problem that a large space is required for installing the whole injection molding system.

In addition, with the conventional molding/assembling method and apparatus, since each molded shell half is taken out from an injection molding die by actuating the robot unit, it is necessary that the injection molding die is widely opened so as to enable an attractive portion of the robot unit to be brought in and then taken out from the injection molding die after each injection molding operation is completed. Because of the foregoing necessity, a die opening time is lengthened, and moreover, a time for bringing the attractive portion of the robot unit in the injection molding die and then taking it out from the injection molding die is additionally required, resulting in a cycle time for each injection molding operation being undesirably lengthened.

SUMMARY OF THE INVENTION

The present invention has been made in consideration of the aforementioned problems to be solved.

According to one aspect of the present invention, there is provided a molding/assembling method comprising the steps of: simultaneously molding two or more molded products each having a different configuration in an injection molding machine; dropping the two or more molded products by their own tare while they are aligned with each other; assembling the two or more molded products together immediately after completion of the dropping; conveying the assembled products through a bed for the injection molding machine, and taking out the assembled products from one end of the bed as seen in the longitudinal direction of the latter.

In addition, according to other aspect of the present invention, there is provided a molding/assembling apparatus comprising an injection molding machine including an injecting unit and a die tightening unit arranged on a bed, an injection molding die mounted on the die tightening unit to simultaneously mold two or more molded products each having a different configuration, an aligning/dropping mechanism for dropping the two or more molded products by their own tare while they are aligned with each other, an assembling mechanism for assembling the two or more molded products together immediately after they are delivered from the aligning/dropping mechanism, and a conveying unit for conveying the assembled products assembled by the assembling mechanism, wherein the assembling mechanism is arranged below the injection molding die, the conveying unit is arranged in the bed, and a discharging section for discharging the assembled products from the conveying unit to the outside is disposed at one end of the bed as seen in the longitudinal direction of the latter.

After molded products are molded in the injection molding die, they are displaced in the downward direction by their own tare with the aid of the aligning/dropping mechanism while they are aligned with each other. After completion of the downward displacement, the assembling mechanism serves to assemble the molded products together by allowing them to be thrusted with a predetermined attitude while they overlap each other. The assembled products are conveyed through the bed by driving the conveying unit until they reach one end of the bed. For example, a stocker is disposed at the one end of the bed so that the assembled products are received in the stocker.

According to another aspect of the present invention, there is provided an aligning/dropping mechanism for two or more kinds of molded products each having a different configuration wherein the molded products ejected from an injection molding die for simultaneously molding the molded products at the positions located along a single vertical plane are caused to drop by their own tare while their opposite sides are held by guide rails, wherein the mechanism has each of the guide rails including separate grooves of which number corresponds to the kinds of the molded products, and that one groove is dimensioned to have a length corresponding to the distance between the eject position for one molded product and the lower end of each of the guide rails and a width more than the thickness of the one molded product, while other groove is dimensioned to have a length corresponding to the distance between the eject position for other molded product and the lower end of each of the guide rails and a width more than the thickness of the other molded product.

In addition, according to another aspect of the present invention, there is provided an aligning/dropping mechanism for two or more kinds of molded products each having a different configuration wherein the molded products ejected from an injection molding die for simultaneously molding the molded products at the positions located along a single vertical plane are caused to drop by their own tare while their opposite sides are held by guide rails, wherein the guide rails are constructed such that the distance between the adjacent guide rails is reduced so as to allow the molded products to be brought into the corresponding grooves in operative association with ejector rods disposed on the movable die half side, the ejector rods being actuated in the course of die opening (from die closing to die opening) or on completion of the die opening.

Molded products molded in an injection molding die are ejected therefrom by actuating ejecting rods, and thereafter they are held by the guide rails. Specifically, the opposite sides of each molded product are brought into grooves on the guide rails so that downward displacement of the molded product is properly guided by the grooves. While the foregoing state is maintained, the molded products are caused to drop by their own tare along the corresponding grooves. On completion of the dropping, they are separately displaced further in the downward direction from the lower ends of the corresponding grooves on the guide rails.

BRIEF DESCRIPTION OF THE DRAWINGS

FIG. 1 is a schematic side view of a molding/assembling apparatus in accordance with an embodiment of the present invention;

FIG. 3 is an enlarged sectional view of the guide rail;

FIG. 4 is a cross-sectional view of the guide rail taken along line 4—4 in FIG. 3;

FIGS. 9(a) to (d) are plan and side views of the dies movement steps in ejection to drop steps.

DETAILED DESCRIPTION OF THE PREFERRED EMBODIMENTS

Figure 2:
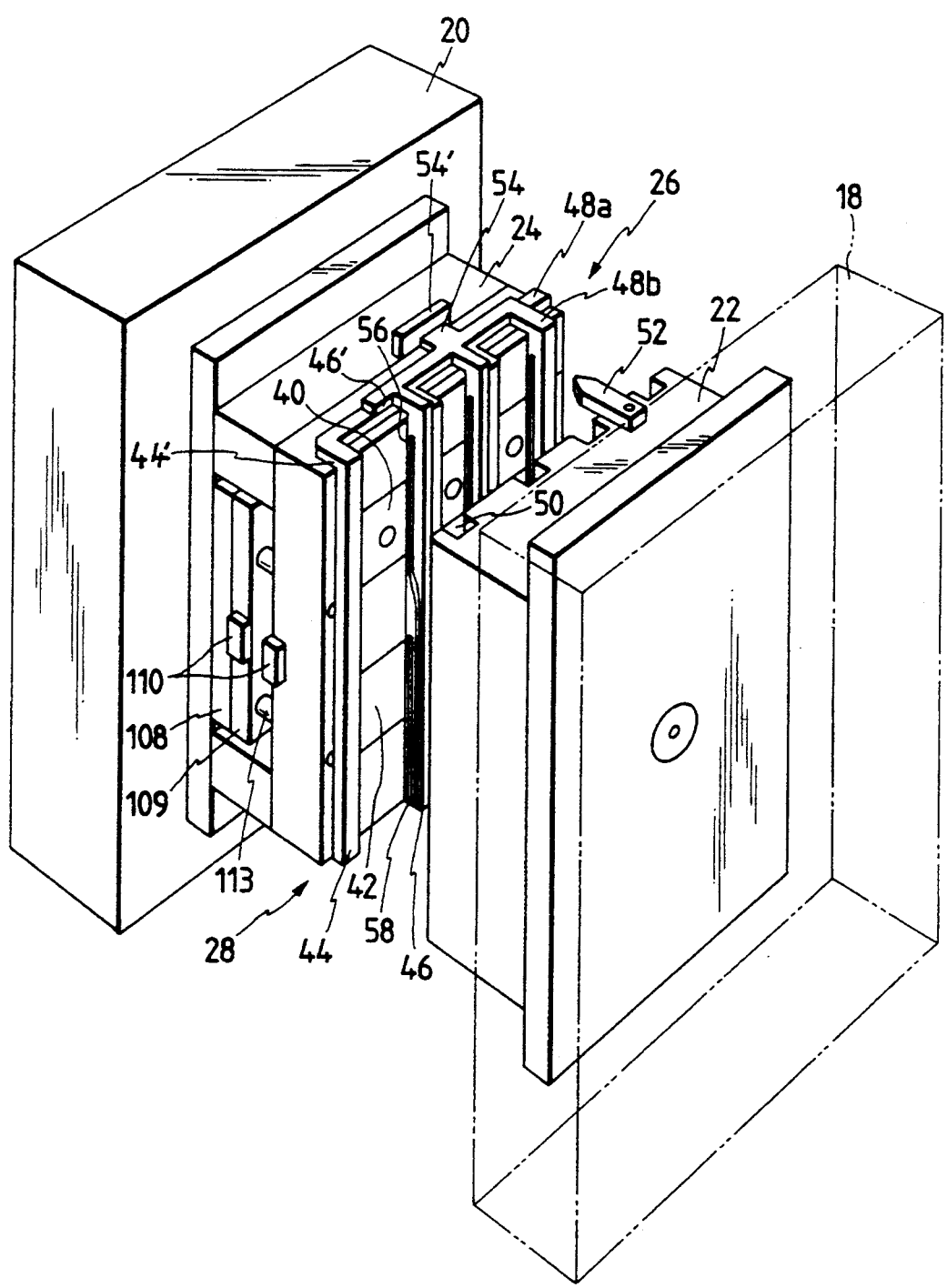
FIG. 2 is a perspective view which shows an injection molding die and guide rails.

To solve the aforementioned problems, it is thinkable for any expert in the art that guide rails each having a groove formed therein are disposed on an injection molding die half so that molded products are caused to drop by their own tare while their opposite sides are properly held by the groove in which the molded product are brought. In this case, since the molded products, i.e., an upper shell half and a lower shell half are guided by an opposing pair of grooves in the same, there arise the following problems. Specifically, in case that a width of each groove is not dimensioned to be sufficiently large compared with the thickness of each shell half, the shell half is seized by the groove in the course of dropping, resulting in the shell half failing to smoothly drop by its own tare. On the contrary, in case that the width of the groove is dimensioned to be excessively large, the shell half which drops later is superimposed on the shell half which drops in advance, causing the groove to be filled with the shell halves, resulting in the shell halves failing to smoothly successively drop. Even though it is assumed that the respective shell halves drop as desired, there arises a necessity for arranging a mechanism for separating the shell half which drops in advance from the shell half which drops later.

An embodiment of the present invention to be described hereinbelow provides certain advantages over the foregoing structure, giving attention to the following structure, giving to the following characteristic of the structure described above.

The embodiment of the present invention will now be described in detail hereinafter with reference to the accompanying drawings which illustrate a preferred embodiment thereof.

FIG. 1 is a schematic side view of a molding/assembling apparatus in accordance with the embodiment of the present invention. An injection molding machine 10 includes as essential components a bed 12, an injecting unit 14 mounted on the upper surface of the bed 12 and a die tightening unit 16. The die tightening unit 16 includes a stationary board 18 and a movable board 20, and a stationary die half 22 is fixedly secured to the stationary board 18, while a movable die half 24 is fixedly secured to the movable board 20. Thus, an injection molding die 26 is composed of the stationary die half 22 and the movable die half 24. An aligning/dropping mechanism 28 is arranged at the position located between both the die halves 22 and 24 of the injection molding die 26 and below the latter in order to displace each molded product in the downward direction while the molded products are aligned with each other. In addition, an assembling mechanism 30 is arranged below the aligning/dropping mechanism 28. A conveying unit 32 is arranged in the interior of the bed 12 on the lower side of the die tightening unit 16. The conveying unit 32 makes it possible to convey assembled products to the left-hand end of the bed 12 as seen in the drawing after they are assembled by the assembling mechanism 30.

Molding and assembling operations are achieved in the following manner by operating the molding/assembling apparatus shown in FIG. 1. After the molding die 26 is tightened by actuating the die tightening unit 16, an molten resin is injected into a die cavity of the injection molding die 26 from the injecting unit 14. On completion of the injection molding, the injection molding die 26 is opened so as to eject molded products in the form of an upper shell half and a lower shell half for a micro-floppy disc (hereinafter referred to simply as an MFD) by actuating an ejecting unit (not shown), and thereafter, the displacement of the molded products in the downward direction is properly guided by the aligning/dropping mechanism 28. One of both the shell halves is turned upside down by the assembling mechanism 30 so that the upper shell half and the lower shell half are assembled with each other to produce a casing. After completion of the assembling operation, each assembled product is conveyed by driving the conveying unit 32 until it is received in a stocker 34 disposed at the left-hand end of the bed 12.

Next, the injection molding die 26 and the aligning/dropping mechanism 28 will be described in more detail below with reference to FIG. 2.

As described above, the movable die half 24 is fixedly secured to the movable board 20, while the stationary die half 22 is fixedly secured to the stationary board 18. Six die cavities, i.e., three lower shell half molding portions 40 and three upper shell half molding portions 42 are formed on the injection molding die 26. The lower shell half molding portions 40 are arranged in the transversely spaced relationship at a predetermined interval, and the upper shell half molding portions are likewise arranged in the transversely spaced relationship below the lower shell half molding portions 40 corresponding to the latter. Guide members 44' and 46' include guide rails 44 and 46, respectively, which are caused to vertically extend along the opposite sides of each set of the lower shell half molding portions 40 and the upper shell half molding portions 42 which are arranged in alignment with each other. A first groove 56 and a second groove 58 to be described later are formed on an opposing pair of side walls of each of the guide rails 44 and 46 and on an opposing pair of side walls of guide rails 46 as shown in FIGS. 2 and 3. Two guide members 44' and 46' are connected to guide rail drive mechanisms 48a, 48b, respectively. The guide drive members 48a, 48b are arranged to be displaceable relative to the movable die half 24 in the horizontal direction. A resilient force derived from a spring (not shown) for displacing each guide rail 44 toward the corresponding guide rail 46 is normally applied to the guide drive mechanism 48a, 48b. In addition, a certain force for displacing each guide rail 46 toward the corresponding guide rail 44 is normally applied to the guide rail 46. It should be added that grooves 50 are formed on the stationary die half 22 for receiving the guide rails 44 and the guide rails 46 when the molding die 26 is closed. A driving cam member 52 is fixedly secured to the upper surface of the stationary die half 22, and a follower cam member 54 is disposed on the guide rail drive mechanism 48a, 48b at the position corresponding to the driving cam member 52. The follower cam member 54 is fixedly secured to the guide rail drive mechanism 48a, 48b. When the driving cam member 52 and the follower cam member 54 are engaged with each other, the guide rail drive mechanism 48a, 48b is expanded to the outside by the driving cam member 52 which serves to displace it in the horizontal direction.

FIG. 3 shows by way of enlarged vertical sectional view the sectional shape of the guide rail 44 which extends in parallel with an axis line of the guide rail 44. As is apparent from the drawing, the first groove 56 and the second groove 58 are formed on the guide rail 44. As shown in FIG. 4, the first groove 56 and the second groove 58 are kept opened on the side located opposite to the guide rail 46 which is illustrated by one dot lines. The first groove 56 extends from the upper end of the guide rail 44 down to the lower end of the same. The upper side of the first groove 56 is positionally offset toward the left side wall of the guide rail 44, and the first groove 56 is bent at the intermediate position so that the lower side of the first groove 56 is positionally offset toward the right side wall of the guide rail 44 as seen in FIG. 3. Basically, the width of the first groove 56 is determined to be slightly larger than the width of each lower shell half. Incidentally, the width of the first groove 56 is slightly enlarged at the bent part of the same. This is intended to assure that each lower shell half is smoothly displaced.

On the other hand, the second groove 58 extends from the position below the bent part of the first groove 56 downstream to the lower end of the guide rail 44. As is apparent from FIG. 3, the second groove 58 linearly extends without formation of any bent part. The distance of the second groove 58 as measured from the left side wall surface of the guide rail 44 is dimensioned to be substantially equal to the distance of the first groove 56 as measured from the left side wall surface of the guide rail 44 on the upper side. The width of the second groove 58 is set to a value slightly larger than the width of each upper shell half. Various conditions of the guide rail 46 are basically the same as those of the guide rail 44 with the exception that both grooves 56 and 58 are oriented toward the guide rail 44.

Next, a receiving guide member 60 and an assembling mechanism 30 for the aligning/dropping mechanism 28 located below the guide rails 44 and 46 will be described below with reference to FIG. 5.

The receiving guide member 60 is disposed below the position where the guide rails 44 and 46 are immovably held while the injection molding die 26 is kept opened (i.e., the position represented by solid lines in FIG. 5.). It should be noted that one dot lines in FIG. 5 represent the position to be assumed by the receiving guide member 60 when the injection molding die 26 is closed. The receiving guide member 60 includes two grooves 62 and 64 which are arranged at the same interval as that of the two grooves 56 and 58 of the guide rails 44 and 46. A discharge chute 66 is secured to the side wall of the receiving guide member 60. A receiving shutter 68 is disposed below the groove 62 of the receiving guide member 60. When the receiving shutter 68 is displaced away from the shown position in the horizontal direction, the lower end of the groove 62 is opened. The receiving guide member 60 can be displaced together with a rotary guide unit 70 to be described later between the position shown in FIG. 5 and another position located leftward of the former.

The rotary guide unit 70 is disposed below the receiving guide member 60. The rotary guide unit 70 includes as essential components a rotary plate 72 adapted to be rotated about a horizontally extending axis, a guide member 74 secured to the rotary plate 72 and a temporary fixing unit 76. The rotary plate 72 is rotationally driven by a driving mechanism (not shown), and it can removably be held at the shown position and another position positonally offset from the former by an angle of 180 degrees. The guide member 74 includes grooves 78 and 80 similar to the grooves 56 and 58 of the guide rails 44 and 46. A stopper 81 is disposed at the lower end of the groove 80. The temporary fixing unit 76 serves to temporarily hold lower shell halves 94 received in the groove 80 and then discharge them to the outside. Specifically, the temporary fixing unit 76 is constructed such that when the rotary plate 72 is rotated by an angle of 180 degrees, a plunger 76a is projected into the groove 80 to firmly hold the lower shell halves 98 so as not to allow them to drop by its own tare. A uniting mechanism 31 constituting a part of the assembling mechanism 30 is disposed below the rotary guide unit 70. The uniting mechanism 31 has grooves 84 and 86 which are divided by a dividing guide 82.

Figure 6:
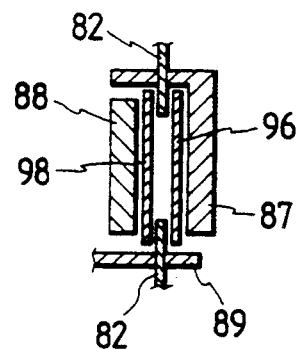
FIG. 6 is a cross-sectional view of an uniting mechanism.

FIG. 6 is a cross-sectional view of the uniting mechanism 31. As shown in the drawing, the uniting mechanism 31 includes a combining plate 87, an assembling pusher 88, separating guides 82 and a combining guide 89 in order to assure that an upper shell half 96 is correctly aligned with a lower shell half 98. With the uniting mechanism 31 constructed in the above-described manner, and moreover, a thrusting force can be applied to both the shell halves 96 and 98 by actuating the assembling pusher 88. An outfeed shutter 90 is disposed below the uniting mechanism 31 so as to open the lower end of the uniting mechanism 31. In addition, a discharge chute 92 and an unacceptable molded product chute 94 are arranged below the uniting mechanism 31.

Further, a conveying unit (conveyor) 32 is arranged below the discharge chute 92.

Next, a mode of operation of the molding/assembling apparatus constructed in the aforementioned manner will be described in more detail below with FIG. 2 and FIGS. 9(a) to (d).

First, a die tightening operation is performed from the die opened state as shown in FIG. 2 by actuating the die tightening unit 16 so that the movable board 20 is displaced toward the stationary board 18. This causes the movable die half 24 to come in tight contact with the stationary die half 22, whereby the die tightening operation is completed. While the die closed state is reliably maintained, a molten resin is injected into the lower shell half molding portions 40 and the upper shell half molding portions 42 of the injection molding die 26 by actuating the injecting unit 14. Subsequently, while the die tightened state is maintained, the driving cam member 52 is brought in engagement with the follower cam member 54 so as to displace the guide rail drive mechanism 48a, 48b in such a direction that the grooves 56 and 58 are opened. Namely, in FIG. 9(a), the follower cam member 54 is connected to drive plate 54' secured to guide rail plate 109. When the die tightening operation is performed, the drive cam member 52 is inserted between first rollers 201 and the follower cam member is pressed by the drive plate 54' through the guide rail plate return pin 113 in the arrow A direction to interpose between the second roller 202 mounted on the upper and lower guide rail drive mechanism, respectively, so that the upper and lower guide mechanisms 48a and 48b are urged against force of spring 204 to expand in the longitudinal direction.

When the movable board 20 is displaced in the rearward direction after completion of the molding operation to reach a predetermined position, the ejector is actuated to eject molded products (upper shell halves 96 and lower shell halves 98), and at the same time, the driving cam member 52 is disengaged from the follower cam member 54, causing the guide rails 44 to be displaced toward the guide rails 46, i.e., in such a direction that molded products are held in the grooves 56 and 58 in the clamped state. Specifically, lower shell halves 98 molded at the upper part of the injection molding die 26 are brought into the first grooves 56, while upper shell halves 96 molded at the lower part of the injection molding die 26 are brought into the second grooves 58. When the lower shell halves 98 and the upper shell halves 96 are held in the clamped state by the guide rails 44 and 46 in the above-described manner, the ejecting unit is restored to the initial position so that the lower shell halves 98 and the upper shell halves 96 are brought in the free state. Subsequently, the lower shell halves 98 and the upper shell halves 96 are lowered along the first grooves 56 and the second grooves 58 by their own tare. In this operation, as shown FIG. 9(b), after the completion of the molding operation, the movable board 20 is displaced in the rearward direction. The upper and lower guide rail mechanisms are maintained in the open state. Subsequently, in FIG. 9(c), guide rail plate 109 is pressed toward the stationary die half 22 by rock bolt 203 through the guide rail plate 109 so as to fit the second rollers 202 into recess portion 54a of the follower cam member 54 so that the lower shell halves 98 and upper shell halves 96 are engaged with the first grooves 56 and second grooves 58, respectively. After that, the guide rail plate 109 is maintained into the forwarded position by engaging mechanic rocks 110 from each other. Subsequently, in FIG. 9(d), the ejector 108 is displaced in the rearward direction so that the upper and lower shell halves are brought in the free state. Hence, the lower shell and upper shell halves 98 and 96 are lowered along the first grooves 56 and the second grooves 58 by their own tare.

As a result, the movement of the guide members 44 and 46 in the longitudinal direction by driving the upper and lower guide rail drive mechanisms 48a and 48b to increase/decrease the distance of the guide rails opposite from each other is synchronized with the movement of the ejector 108 in the forward and rearward directions.

Figure 5:
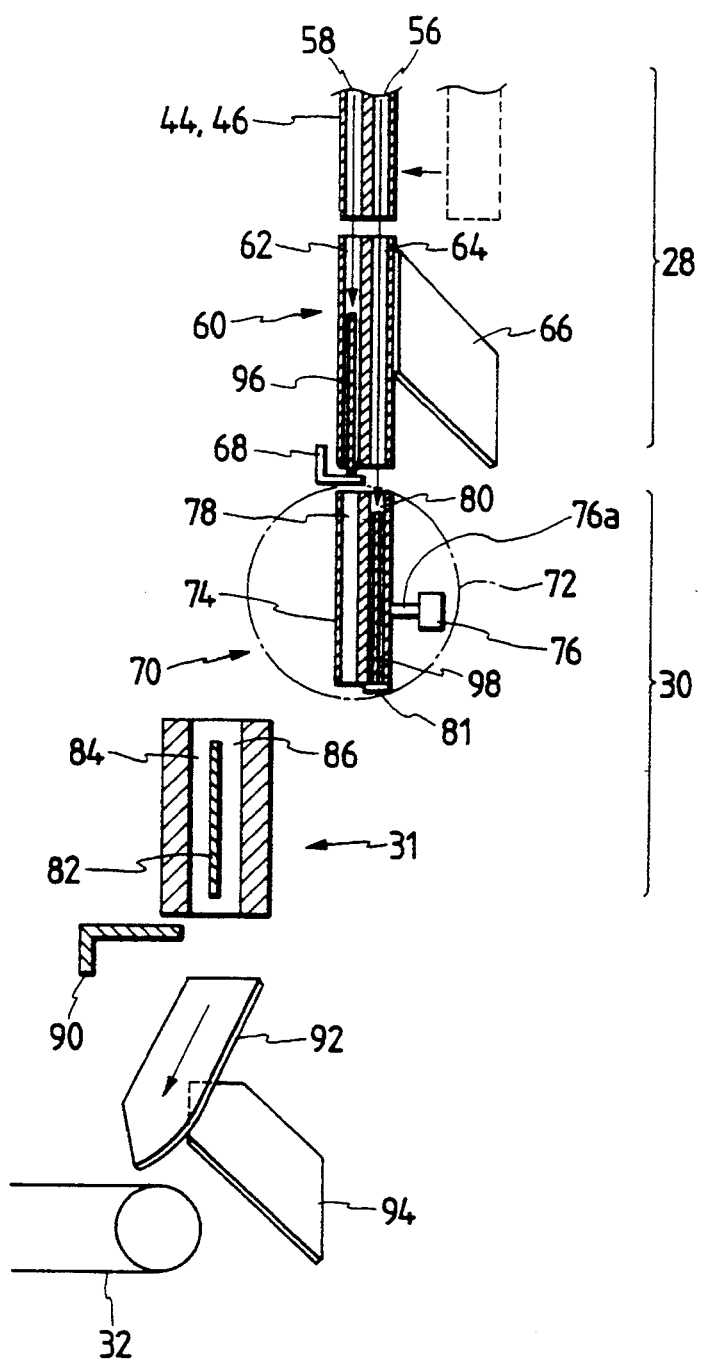
FIG. 5 is an illustrative view which shows arrangement of an aligning/dropping mechanism and an assembling mechanism.

After the upper shell halves 96 drop to the lower ends of the guide rails 44 and 46, they are brought in the groove 62 of the receiving guide member 62 which serves to prevent them from being lowered further with the aid of the receiving shutter 68 (see FIG. 5).

On the other hand, the lower shell halves 98 pass through the groove 64 of the receiving guide member 60 and then enter the groove 80 of the rotary guide unit 70 which serves to immovably hold them with the aid of a stopper 81 disposed at the lower end thereof. When the upper shell halves 96 and the lower shell halves 96 are lowered to the foregoing positions, this is detected by sensors (not shown). In response to signals transmitted from the sensors, the injection molding machine 10 starts a next molding cycle.

Figure 7:
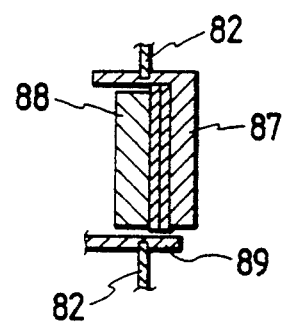
FIG. 7 is a cross-sectional view of the uniting mechanism, particularly showing that an assembling pusher is displaced in the forward direction.
Figure 8:
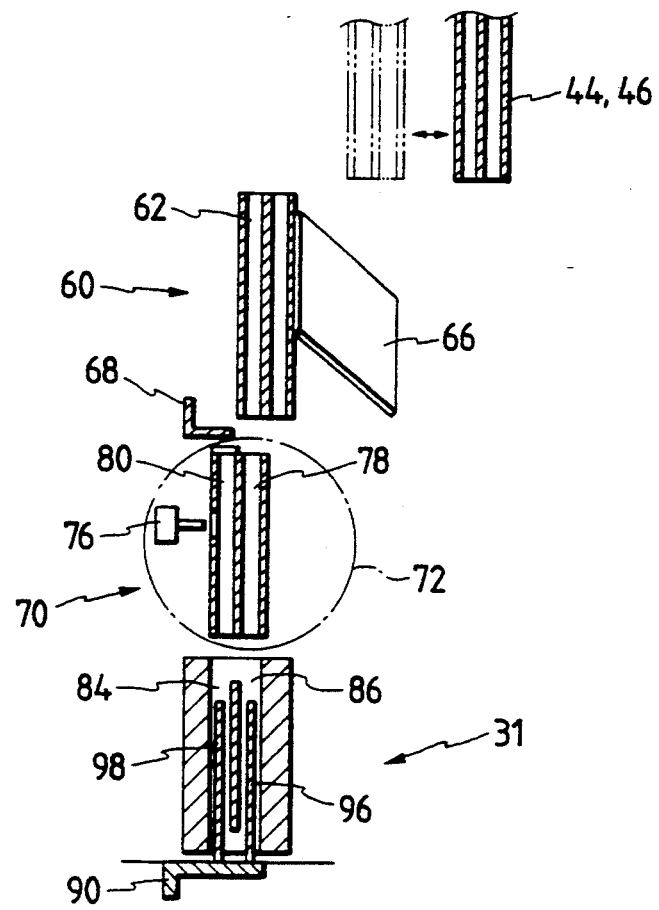
FIG. 8 is a sectional view of the uniting mechanism, particularly showing that upper shell halves and lower shell halves are received in the uniting mechanism.
Figure 9A:
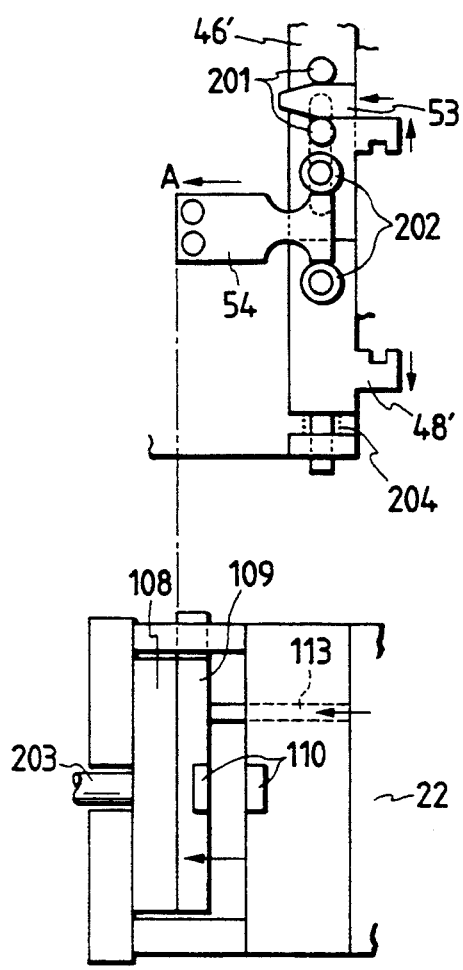
Figure 9B:
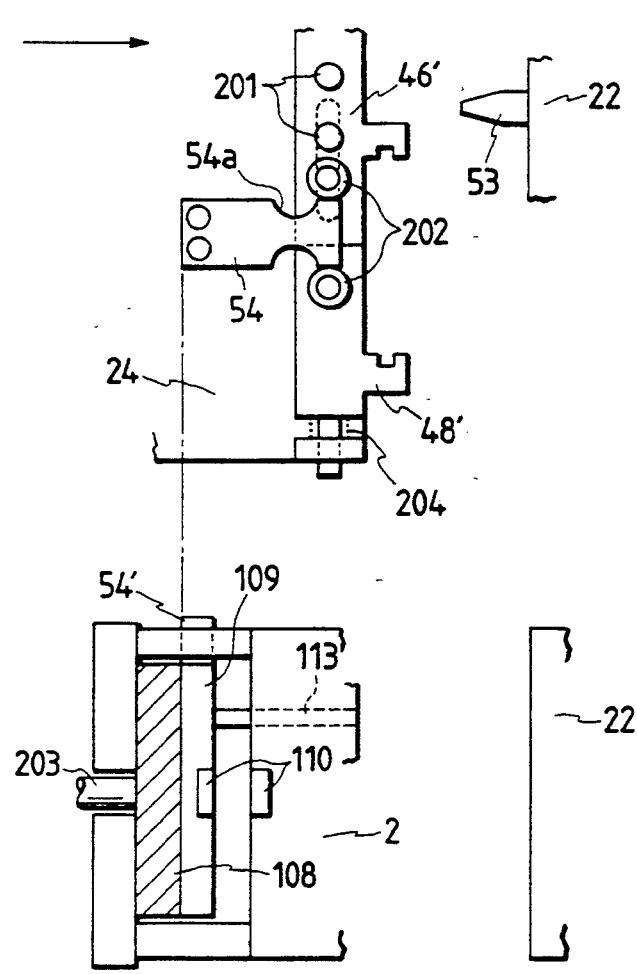

After the receiving guide member 60 and the rotary guide unit 70 receive the upper shell halves 96 and the lower shell halves 98, they are displaced in the leftward direction as seen in FIG. 5 to reach the positions above the uniting mechanism 31 (see FIG. 8). At the same time, the temporary fixing unit 76 is actuated to firmly hold the lower shell halves 98. Subsequently, the rotary plate 72 is rotated by an angle of 180 degrees. On completion of the rotation, the groove 62 is located in vertical alignment with the groove 78. Subsequently, the receiving shutter 68 is displaced to the opened side and the temporary fixing unit 76 is released from the fixing state. Thus, the upper shell halves 96 drop in the groove 86, while the lower shell halves 98 drop in the groove 84 of the uniting mechanism 31. Subsequently, the combining guide 89 of the uniting mechanism 31 is displaced in the forward direction so as to correctly locate the upper shell halves 96 relative to the lower shell halves 98. Subsequently, the separating guides 82 are displaced from the separated position to the released position (see FIG. 6). While the foregoing positional state is maintained, the assembling pusher 88 is actuated so as to allow the upper shell halves 96 to be united with the lower shell halves 98 (see FIG. 7). At this time, since the lower shell halves 98 are inverted by the rotary guide unit 70, both the upper shell halves 96 and the lower shell halves 98 are held in such a state that their molded surfaces on the movable die half 20 side are located opposite to each other. It should be noted that assembling bosses and holes (not shown) are formed on the molded surfaces of the upper shell halves 96 and the lower shell halves 98 on the movable die half 20 side. When both the upper shell halves 96 and the lower shell halves 98 are thrust by the pusher 88 after they are assembled together, the bosses are fitted into the corresponding holes so that both the upper shell halves 96 and the lower shell halves 98 are integrally united with each other to build an integral structure, i.e., to produce a casing.

When the assembling operation is completed, the discharge shutter 90 is opened, and thereafter, the pusher 88 is displaced in the rearward direction, causing the assembled products to drop on the conveying unit 32 via the discharge chute 92 by their own tare. Then, the assembled products are conveyed to the outside away from the bed 12 by driving the conveying unit 32.

When it is detected that some upper shell halves 96 and lower shell halves 98 are not acceptable due to incorrect injection molding, incorrect actuation of the assembling mechanism 30 or the like, the discharge chute 66 is displaced to the position located below the guide rails 44 and 46 (i.e., the position shown in FIG. 8), whereby the upper shell halves 96 and the lower shell halves 98 are discharged to the outside via the discharge chute 66.

In case that there arises a necessity for discharging the upper shell halves 96 and the lower shell halves 98 to the outside because they are incorrectly received for some reason, the unacceptable molded product discharge chute 94 is displaced to the position located below the uniting mechanism 31 and the outfeed shutter 90 is opened so that they are discharged to the outside via the unacceptable molded product discharge chute 94. Also in case that an assembling operation is abnormally performed with the assembling mechanism 30, they are likewise discharged to the outside via the unacceptable molded product discharge chute 94.

As is apparent from the above description, according to the present invention, molded products drop downward with respect to the injection molding die and they are then immediately assembled together so that the assembled products are conveyed to the outside by driving the conveyor disposed in the bed. Consequently, there does not arise a necessity for arranging extra units around the injection molding machine, refusing in the space required for installing the whole injection molding system being substantially reduced. In addition, since molded products are caused to drop with the aid of the guide rails, it is not necessary that the injection molding die is widely opened for the convenience of taking out molded products therefrom. Further, since a time for bringing robot units in and then taking them out from the injection molding system is not required at all, a cycle time for each injection molding operation can be substantially shortened.

What is claimed is:

1. An apparatus for assembling molded products comprising:
   an injection molding machine including:
   an injecting unit and a die tightening unit arranged on a bed;
   an injection molding die mounted on said die tightening unit to simultaneously mold at least two molded products each having a different configuration, said injection molding die including a movable die half;
   a mechanism for dropping said at least two molded products by their own tare while said at least two molded products are aligned with each other through guide rails;
   an assembling mechanism for assembling said at least molded products together immediately after said at least two molded products are delivered from said mechanism; and
   a conveying unit for conveying assembled products assembled by said assembling mechanism,
   wherein said assembling mechanism is arranged below said injection molding die, said conveying unit being arranged in said bed, and a discharging section for discharging said assembled products from said conveying unit is disposed at one end of said bed in the longitudinal direction of said bed.

2. A apparatus for assembling molded products as claimed in claim 1, wherein each of said guide rails includes separate grooves corresponding in number to said at least two molded products.

3. An apparatus for assembling molded products as claimed in claim 1, wherein each of said guide rails includes a pair of grooves, respectively, one groove is dimensioned to have a length corresponding to the distance between an eject position for a first molded product and the lower end of each of said guide rails and a width more than the thickness of said first molded product, while the other groove is dimensioned to have a length corresponding to the distance between an eject position for a second molded product and the lower end of each of said guide rails and a width more than the thickness of said second molded product.

4. An apparatus for assembling molded products as claimed in claim 2, wherein said guide rails are constructed in such a manner that a distance between the adjacent guide rails is reduced so as to allow side edge portions of said molded product to be brought into contact with said grooves, respectively, in association with a die opening operation and completion of said die opening actuated by operation of an ejector rod provided with said injection molding machine.

* * * * *